United States Patent Office 2,835,660
Patented May 20, 1958

2,835,660

POLYAZO DYESTUFFS

Hans Baumann, Ludwigshafen (Rhine), Germany, assignor to Badische Anilin- & Soda-Fabrik Aktiengesellschaft, Ludwigshafen (Rhine), Germany No Drawing. Application August 30, 1955
Serial No. 531,574

6 Claims. (Cl. 260—144)

This invention relates to new polyazo dyestuffs. More particularly, the invention relates to a new class of polyazo dyestuffs derived from a 4.4′-diamino-diphenylmethane-3.3′-dicarboxylic acid and to a process of manufacturing these dyestuffs.

It is an object of this invention to provide new polyazo dyestuffs, in particular polyazo dyestuffs for coloring leather.

Another object is to provide polyazo dyestuffs derived from a 4.4′-diamino-diphenylmethane-3.3′-dicarboxylic acid and containing at least four azo groups and at least two sulfonic acid groups.

A further object of this invention are complex metal compounds, in particular complex cupric compounds, of said new polyazo dyestuffs.

A still further object is to provide a method for preparing these dyestuffs.

Other objects and advantages will become apparent from the more detailed description of the invention.

These objects are realized by polyazo dyestuffs having the general formula

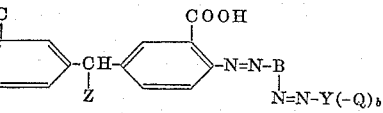

wherein Z represents a member selected from the group consisting of hydrogen, a lower alkyl group, and a phenyl group; A and B each represent a bivalent radical of a twice-coupling aromatic compound having 1–2 aromatic rings, said rings having at least one and not more than two substituents selected from the group consisting of hydroxy and amino groups, said rings further having 0–2 sulfonic acid groups, said rings being otherwise unsubstituted; X and Y each represent a member selected from the group consisting of a benzene, a naphthalene, and a diphenyl nucleus; L and Q each represent at least one member from the group consisting of hydrogen, chloro, hydroxy, nitro, amino, lower alkyl, sulfonic acid, phenylazo, a naphthylazo group, lower alkyl N-substituted amino group, and a phenyl N-substituted amino group; $a$ and $b$ represent an integer of 1–3, inclusive; and A, B, X, and Y have a total of at least two sulfonic acid groups.

The outstanding merit of this new polyazo dyestuff is the fact that they are in particular in the form of their complex compounds with heavy metal salts, such as copper, cobalt or chromium salts, excellent dyestuffs for leather, and yield thereby deep, dark brown to black shades having a very good fastness.

The polyazo dyestuffs of this invention may be prepared by tetrazotizing a 4.4′-diamino-diphenylmethane-3.3′-dicarboxylic acid of the formula

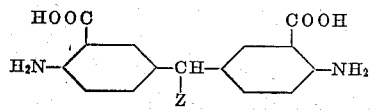

wherein Z is a hydrogen, phenyl or alkyl radical, and then coupling the resultant tetrazo compound with two molecules of aromatic compounds capable of being coupled and which still contain at least one azo group each and at least two sulfonic acid groups together.

According to one embodiment of the invention, the new polyazo dyestuffs may be obtained by coupling one molecule of the tetrazotized 4.4′-diamino-diphenylmethane-3.3′-dicarboxylic acid with two molecules of an aromatic azo compound which contains an aromatic radical with at least two coupling directing groups which are hydroxy and/or amino groups.

An example of such aromatic azo compounds is the mono azo dyestuff prepared by reacting diazotized p-nitroaniline with 1-amino-8-hydroxynaphthalene-3.6-disulfonic acid, the said dyestuff having the formula

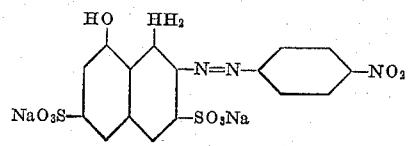

or the disazo dyestuff of the formula

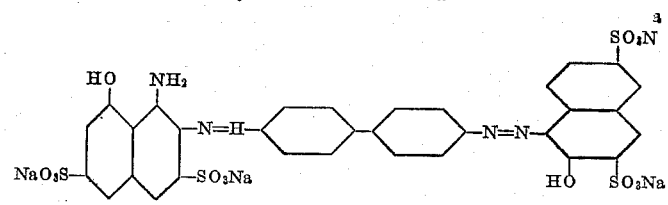

prepared by coupling one molecule of tetrazotized benzidine with one molecule of 1-amino-8-hydroxy naphthalene-3.6-sulfonic acid and one molecule of 2-hydroxy naphthalene-3.6-sulfonic acid.

According to another embodiment of the invention, one molecule of the tetrazotized 4.4′-diamino-diphenylmethane-3.3′-dicarboxylic acid is coupled first with an aromatic compound (I) which is free from azo groups but contains at least two coupling directing groups which are hydroxy and/or amino groups, and one molecule of the disazo dyestuff thus obtained is converted then by a further coupling reaction with two molecules of an aromatic compound (II) into a polyazo dyestuff, the radicals of the aromatic compounds used for the two coupling reactions containing together at least two sulfonic acid groups.

If, for the first coupling reaction, aromatic compounds which are free from amino groups are used, the second coupling reaction may be performed with two molecules of any aromatic diazo compound. If, however, the aromatic compounds used in the first coupling reaction contain amino groups, the resulting disazo-amino dyestuff can be tetrazotized and coupled with an aromatic compound capable of being coupled with a diazo or tetrazo compound.

Suitable 4.4′-diamino-diphenylmethane-3.3′-dicarboxylic acids may be prepared by condensing one molecule of anthranilic acid or of its homologues with one molecule of an aldehyde, such as formaldehyde, acetaldehyde or benzaldehyde, in acid medium as described by Heller and Fisselmann (Liebigs Annalen der Chemie, vol. 324 (1902), p. 118). It is also possible to prepare the 4.4′-diaminodiphenylmethane-3.3′-dicarboxylic acids in situ and to tetrazotize the raw and unpurified reaction mixture without isolating the 4.4'-diaminodiphenylmethane-3.3'-dicarboxylic acids.

Compounds which may be coupled with the tetrazotized 4.4'-diamino-diphenylmethane 3.3'-dicarboxylic acids are compounds of the benzene and naphthalene series which contain two coupling directing groups which are hydroxy and/or amino groups such as resorcinol, 1.3-diaminobenzene, 1.8-dihydroxynaphthalene mono- and disulfonic acids, 1.6-dihydroxynaphthalene-3-sulfonic acid, 3-amino phenol, 3-hydroxydiphenyl amine or 1-amino-8-hydroxy naphthalene and their sulfonic acids.

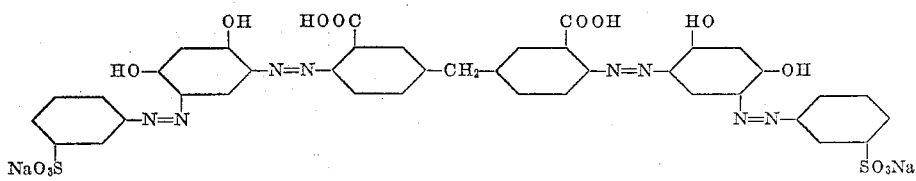

As diazo components which may be coupled onto the disazo dyestuff, formed by the first coupling reaction, where an aromatic compound which is free from amino groups has been used for this first coupling reaction, the diazotization products of aniline and its homologues and of their nitro or halogenated derivatives, such as nitro-anilines and toluidines, 2.5-dichloro-aniline, sulfanilic and metanilic acids, 4-chloroaniline-3-sulfonic acid, aniline-2.5-disulfonic acid, 4-aminoazobenzene-3.4'-disulfonic acid, or of naphthylamines or their mono- or disulfonic acid derivatives, such as 1-aminonaphthalene-4-sulfonic acid or 2-aminonaphthalene-4.8-disulfonic acid may be employed. The selection of this compound is made in such a manner that the polyazo dyestuff formed contains at least two sulfonic acid groups. The term "sulfonic acid" includes the free sulfonic acids as well as the salts of these acids, in particular their alkali and ammonia salts.

If a diamino or hydroxyamino compound, preferably of the benzene or naphthalene series, has been used for the first coupling reaction with the tetrazotized 4.4'-diamino-diphenylmethane-3.3'-dicarboxylic acid, this coupling product may be diazotized or tetrazotized again and coupled then with an aromatic compound capable of being coupled preferably of the benzene or naphthalene series, such as a naphthol, a naphthylamine or a sulfonic acid of these compounds, an amino naphthol or a sulfonic acid thereof, a 1.3-dihydroxy or a 1.3-diamino benzene, a 1.3-hydroxyamino benzene or the N-alkyl or N-aryl derivatives of these compounds. Care must be taken while performing this reaction that the formed polyazo dyestuffs contain at least two sulfonic acid groups.

The new polyazo dyestuffs may be converted into their complex metal dyestuffs in the conventional manner, for instance, by reacting them with cupric, cobalt or chromium salts in aqueous solution or suspension, if necessary by adding basic compounds such as ammonia or amines.

The new polyazo dyestuffs and their metal complex compounds are excellently suitable for dyeing tanned leather irrespective of the manner in which the leather has been tanned. On account of their good dyeing capacity, they can be used in particular for the production of suede leather. Since they have usually a good solubility even in acid baths, the leathers may also be dyed with these dyestuffs from concentrated baths without bronzing the dyed leather.

The following examples are given to illustrate the invention. The parts are given by weight unless otherwise specified.

Example 1

28.6 parts of 4.4'-diamino-diphenyl-methane-3.3'-dicarboxylic acid are dissolved in 250 parts of water and 50 parts of hydrochloric acid (density 1.16), and tetrazotized with 13.8 parts of sodium nitrite at a temperature between about 0 and 2° C. The formed tetrazo compound is combined at about 0° C. with a solution of 22.0 parts of resorcinol dissolved in 200 parts of 10% aqueous sodium hydroxide solution. After the coupling reaction has been completed, the formed "intermediate disazo dyestuff" is precipitated by the addition of hydrochloric acid, filtered and dissolved in 600 parts of water while adding excess sodium carbonate. The diazo compound of 35 parts of metanilic acid is then added to said solution. A tetrakis azo dyestuff having the formula is formed. This dyestuff dyes leather in reddish brown shades with a good fastness. On suede leather buff-fast, deep reddish brown shades are obtained.

Example 2

The "intermediate disazo dyestuff" of Example 1 is coupled with the diazo compound of 51 parts of aniline-2.4 or 2.5-disulfonic acid. The obtained tetrakis azo dyestuff is heated several hours in aqueous solution with 50 parts of crystalline cobalt-II-chloride and 32 parts of sodium acetate. A cobalt complex compound is formed thereby which dyes chrome tanned leather yellowish brown shades with a good fastness. The corresponding copper complex compound yields on leathers, tanned by various methods, medium brown shades, the chromium complex compounds reddish brown shades.

Example 3

A solution of 15.0 parts of anthranilic acid in 125 parts of water and 25 parts of 36.5% hydrochloric acid is mixed at 70° C. with 58 parts of a 3% aqueous formaldehyde solution. The mixture is stirred at 70° C. for several hours until the condensation is completed, cooled to 0° C. and tetrazotized with 7.5 parts of sodium nitrite. The obtained tetrazo compound is coupled with a solution of 11.0 parts of resorcinol in 200 parts of a 5% aqueous sodium hydroxide solution. To the solution of the formed "intermediate disazo dyestuff," a solution of 16 parts sodium bicarbonate in 300 parts of water is added. Then the diazo compound of 36 parts of 4-amino-azobenzene-3.4'-disulfonic acid is added. The formed hexakis azo dyestuff of the formula

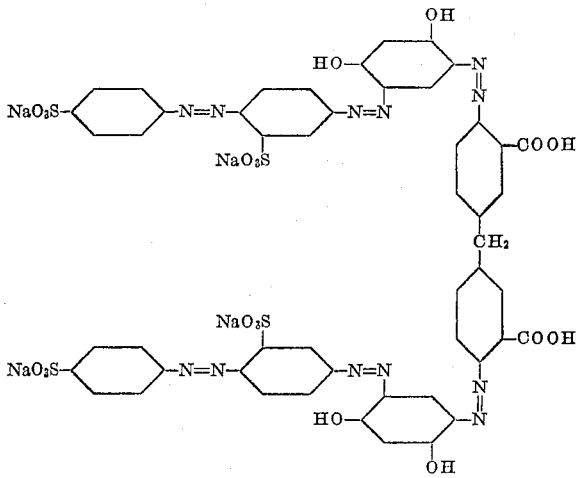

is salted out, sucked off, and dissolved in water which contains a small amount of ammonia. A solution of 25.0 parts of crystalline copper sulfate in excess aqueous ammonia is added and the polyazo dyestuff converted in its copper complex compound by heating. This complex compound dyes leather manufactured by various tanning processes fast neutral brown shades.

If instead of 4-amino-azobenzene-3.4'-disulfonic acid there is used an equivalent amount of an amino azo dyestuff obtained by coupling diazotized 2-naphthylamine-5.7-disulfonic acid with 1-naphthylamine in conventional manner, a polyazo dyestuff of the formula

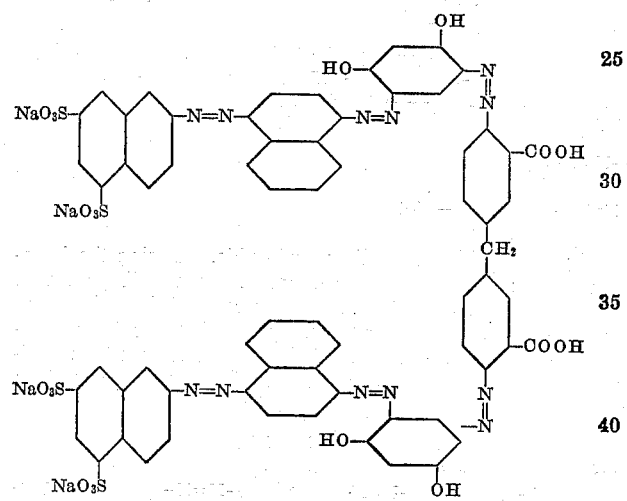

is formed. The copper complex compound of this dyestuff prepared by the usual methods yields fast reddish brown shades on leather.

Example 4

28.6 parts of 4.4'-diamino-diphenylmethane-3.3'-dicarboxylic acid are tetrazotized as in Example 1 and coupled with 63.0 parts of 1-amino-8-hydroxy-naphthalene-3.6-disulfonic acid in the presence of excess sodium carbonate. The formed "intermediate disazo dyestuff" is isolated by acidifying and salting out and dissolved in 1000 parts of water containing 8 parts of a 50% aqueous sodium hydroxide solution. This solution is tetrazotized by the addition of 7.5 parts of sodium nitrite and 70 parts of 36.5% hydrochloric acid at a temperature of about 5° C. The reaction mixture is stirred for three hours and the excess of nitrite removed by the addition of urea. Then an aqueous solution of 22 parts of 1.3-diamino-benzene is added. By adding gradually a solution of 56 parts of crystalline sodium acetate in 200 parts of water, the coupling reaction is completed. The formed tetrazo dyestuff is sucked off, dissolved in 200 parts of hot water which contains 20 parts of water-free sodium carbonate, and precipitated then by the addition of sodium chloride. The obtained tetrazo dyestuff of the formula

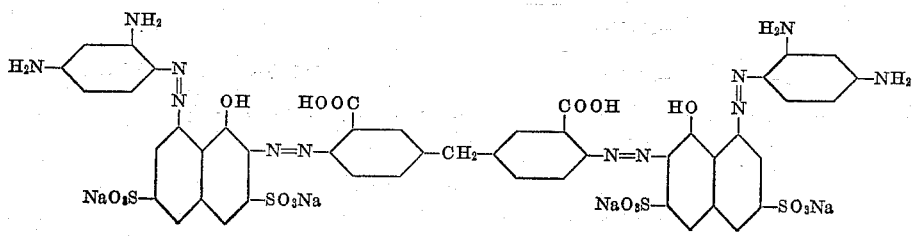

dyes chrome tanned leather deep brown shades with a good fastness.

If the 1-amino-8-hydroxynaphthalene-3.6-disulfonic acid is replaced by 1-amino-8-hydroxynaphthalene-4.6-disulfonic acid, a tetrazo dyestuff is formed which under analogous conditions dyes the leather somewhat more reddish brown shades.

Example 5

The "intermediate disazo dyestuff" of Example 4 is tetrazotized as is described in Example 4, and then coupled with 22 parts of resorcinol while an excess of sodium carbonate is added. The formed tetrakis azo dyestuff of the formula

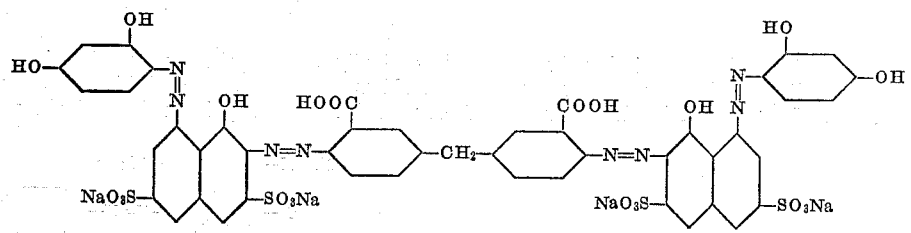

is sucked off.

The dyestuff is dissolved in 2000 parts of water. To this solution 52.5 parts of crystalline copper sulfate and 60 parts of crystalline sodium sulfate is added, and then the mixture is heated to about 95° C. for one hour. By salting out, a copper complex compound is isolated which dyes leather deep neutral brown shades having an excellent fastness.

Example 6

15.0 parts of anthranilic acid are condensed in an aqueous solution containing hydrochloric acid as described in Example 3, with 5.8 parts of a 30% aqueous formaldehyde solution. The condensation product is tetrazotized and coupled with 31.9 parts of 1-amino-8-hydroxynaphthalene-3.6-disulfonic acid in the presence of sodium carbonate. The "intermediate disazo dyestuff" is sucked off, dissolve and tetrazotized again and coupled in an alkaline medium with 19 parts of 3-hydroxy-di-phenyl-amine. The solution of the formed tetrakis azo dyestuff having the formula

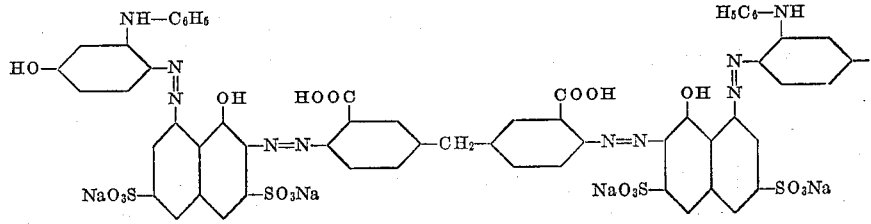

is neutralized with sulfonic acid and 27.5 parts of crystalline copper sulfate are added. This solution is then boiled shortly. The formed copper complex dyestuff is salted out while the solution is still hot and then sucked off. It dyes chrome tanned leather greenish black shades having an excellent fastness.

If during the last coupling reaction one-half of the 3-hydroxy-diphenylamine is replaced by 5.5 parts of resorcinol, a mixed polyazo dyestuff of the formula

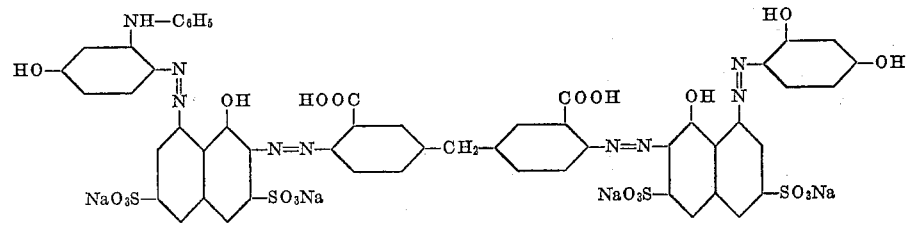

is formed which gives a copper complex compound dyeing leather fastly in deep black shades.

*Example 7*

137.0 parts of anthranilic acid are mixed with 100 parts of hydrochloric acid (density 1.085). After the addition of 52.5 parts of benzaldehyde and 5.0 parts of a 40% sodium bisulfite solution the mixture is gradually heated while refluxing to a temperature between 100 and 105° C. The mixture is stirred for several hours at this temperature until the condensation is completed. In the still hot mixture, 400 parts of hydrochloric acid (density 1.085) are introduced while stirring and the obtained clear solution is diluted by the addition of water to 1000 parts by volume.

200 parts by volume of this solution are then mixed with an aqueous solution of 13.8 parts of sodium nitrite at a temperature of about 0° C. The partly separated yellow tetrazo compound is gradually introduced into a solution which was obtained by coupling 24.8 parts of diazotized p-nitroaniline with 54.6 parts of 1-amino 8-hydroxynaphthalene-3.6-disulfonic acid, this acid solution having been neutralized after the coupling reaction by the addition of sodium hydroxide. During the introduction of the tetrazo compound, the coupling mixture is kept permanently alkalized by the addition of sodium carbonate. After the coupling reaction has been completed, the formed dyestuff is salted out from the boiling reaction mixture and sucked off while still hot. The obtained tetrazo dyestuff of the formula

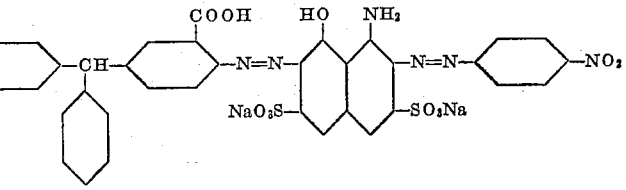

dyes chrome tanned grain leather and bark tanned leather the same dark blue shades with good fastness.

A polyazo dyestuff of the formula

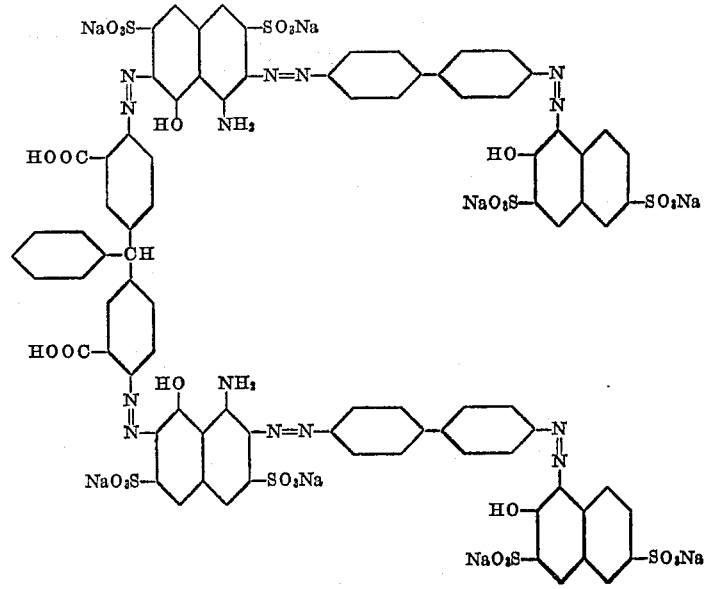

giving similar dark blue shades on leather, is obtained when there is used instead of diazotized p-nitro-aniline the coupling product of one molecule of tetrazotized benzidine and one molecule of 2-hydroxy-naphthalene-3.6-disulfonic acid containing still one diazo group.

I claim:

1. A member selected from the class consisting of a polyazo dyestuff of the general formula

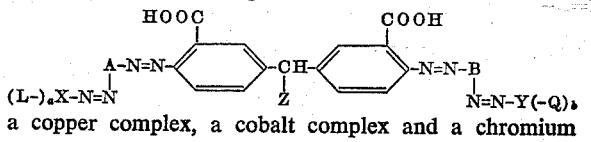

a copper complex, a cobalt complex and a chromium complex of said polyazo dyestuff wherein Z represents a member selected from the group consisting of hydrogen, a lower alkyl group, and a phenyl group; A and B each represent a bivalent radical of a twice-coupling aromatic compound having 1–2 aromatic rings, said rings having at least one and not more than two substituents selected from the group consisting of hydroxy and amino groups, said rings further having 0–2 sulfonic acid groups, said rings being otherwise unsubstituted; X and Y represent a member selected from the group consisting of a benzene, a naphthalene, and a diphenyl nucleus; L and Q each represent at least one member from the group consisting of hydrogen, chloro, hydroxy, nitro, amino, lower alkyl, sulfonic acid, phenylazo, a naphthylazo group, lower alkyl N-substituted amino group, and a phenyl N-substituted amino group; $a$ and $b$ represent an integer of 1–3, inclusive; and A, B, X, and Y have a total of at least two sulfonic acid groups.

2. A member from the group consisting of the tetrakis azo dyestuff of the formula

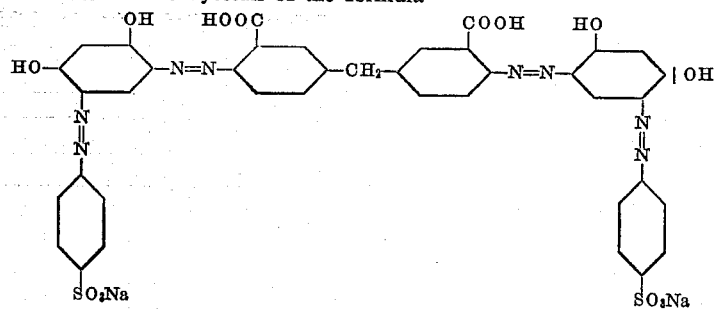

and its cupric complex compound.

3. A member from the group consisting of the tetrakis azo dyestuff of the formula

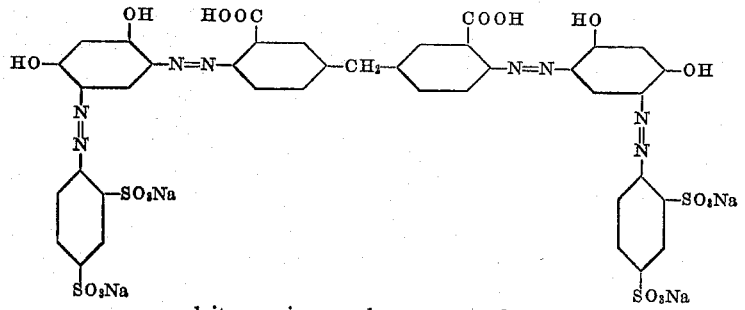

and its cupric complex compound.

4. A member from the group consisting of the hexakis azo dyestuff of the formula

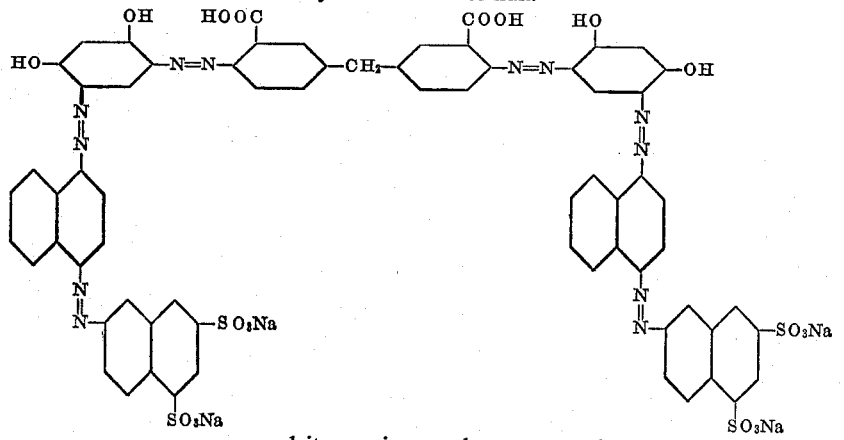

and its cupric complex compound.

5. A member from the group consisting of the tetrakis azo dyestuff of the formula

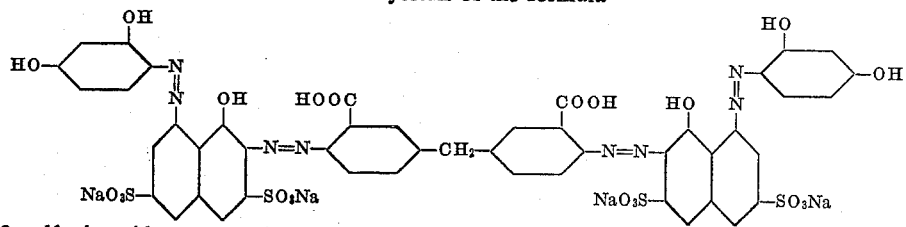

and its cupric complex compound.

6. A member from the group consisting of the tetrakis azo dyestuff of the formula
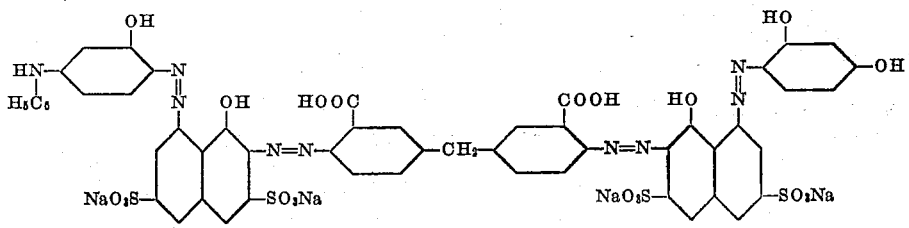
and its cupric complex compound.
References Cited in the file of this patent
UNITED STATES PATENTS
| | | |
|---|---|---|
| 2,264,682 | Trepagnier | Dec. 2, 1941 |
| 2,384,419 | Fleischhauer et al. | Sept. 4, 1945 |
FOREIGN PATENTS
| | | |
|---|---|---|
| 930,409 | Germany | July 14, 1955 |